Patented Apr. 7, 1942

2,278,530

UNITED STATES PATENT OFFICE 2,278,530

AMMUNITION

Willi Brun, Bridgeport, Conn., assignor to Remington Arms Company, Inc., a corporation of Delaware No Drawing. Application July 5, 1940, Serial No. 344,114

3 Claims. (Cl. 52—2)

This invention relates to ammunition, and particularly to priming compositions for use in ammunition. In priming compositions such as usually employed in small arms ammunition, it is customary to use ground glass to assist in sensitizing the composition. A priming composition usually comprises a combustion initiator, a fuel, an oxidizer, and, if necessary, a frictionator such as ground glass. The frictionator or ground glass is particularly necessary in the usual rim-fire cartridge, although it may also be useful in a centerfire priming mixture. Ground glass apparently has the required sharp edges and hardness to produce the necessary friction or sensitization as the primer is struck a blow by the firing pin to cause the mixture to be properly ignited.

There have been many attempts to substitute other materials for ground glass, but none of these have been entirely satisfactory for various reasons. One of the principal reasons appears to be that the broken pieces do not have the requisite sharp edges or hardness to properly function as indicated. Most minerals upon being comminuted to a suitable granulation tend to break into particles having no jagged edges or sharp corners. The frictionator or substances used must be stable so as to not reduce the stability of the priming composition, and particularly under high humidity at elevated temperatures. It has been found by the present invention that a comminuted natural occurring glass can be substituted for ground glass and that the natural occurring glass will satisfactorily meet the requirements of a frictionator.

Other objects of the invention will become apparent to those skilled in the art when the following description is read.

It has been found that a natural occurring glass will perform satisfactorily which has the chemical composition of:

| | Per cent |
|---|---|
| Silica | 59.50 |
| Ferric oxide | 0.35 |
| Alumina | 25.00 |
| Calcium oxide | 6.90 |
| Soda and potash | 7.80 |
| Loss on ignition | 0.45 |

The mineralogical composition of this natural occurring glass is:

| | |
|---|---|
| 23% zoisite | ($HCa_2Al_3Si_3O_{12}$=Silica 29.7%, alumina 33.7%, lime 24.6%, water 2%, belongs to epidote family of silicate minerals—Hardness 6–6.5%.) |
| 55% albite | ($NaAlSi_3O_8$=Silica 68.7%, alumina 19.5%, soda 11.8%—is one of the plagioclase feldspars—Hardness 6.) |
| 2% { titanite | ($CaTiSiO_5$=Silica 30.6%, titanium oxide 40.8%, lime 28.6%—Hardness 5–5.5%.) |
| apatite | ($Ca_4(CaF)(PO_4)_3$—Hardness 5.) |
| clino-zoisite | (A monoclinic or triclinic modification of zoisite.) |
| 2% quartz | ($SiO_2$=silica 100%—Hardness 7.) |
| 13% sericite | ($H_2KAl_3(SiO_4)_3$—is a mica—Hardness 2–2.5%.) |
| 5% microcline | ($KAlSi_3O_8$=silica 64.8%, alumina 18.4%, potash 16.9%—is a feldspar—Hardness 6–6.5%.) |

It is seen that the natural occurring glass which may be used consists principally of silicates, feldspars and mica with small percentages of other ingredients such as apatite and quartz. The hardness of the natural occurring glass that was used is between 6 and 7 on the Moh scale, which is similar to that of glass. It is evident that the minerals are present in a microcrystalline condition and that no crystals will be visible to the naked eye.

The natural occurring glass referred to can also be described as a zoisitic aplite rock in accordance with the article entitled "Aplite, a New Ceramic Material" by Dear & Whittemore, appearing in the Journal of the American Ceramic Society, 1940, vol. 23, pages 77–80.

A priming mixture which performs satisfactorily with the use of the natural occurring glass is as follows:

| | Per cent |
|---|---|
| Tetrazene | 2 |
| Lead styphnate | 40 |
| Lead nitrate | 30 |
| Lead sulphocyanate | 8 |
| Natural occurring glass | 20 |

This priming composition was subjected to the usual humidity tests and it was found that it satisfactorily withstands the same.

Other examples of priming mixtures in which natural occurring glass will work are:

| | Per cent |
|---|---|
| Lead styphnate | 33 |
| Lead hypophosphite | 10 |
| Lead nitrate | 12 |
| Barium nitrate | 20 |
| Lead peroxide | 5 |
| Natural occurring glass | 20 |
| | |
| Lead styphnate | 20 |
| Mercury fulminate | 20 |
| Barium nitrate | 30 |
| Calcium silicide | 10 |
| Antimony sulphide | 10 |
| Natural occurring glass | 10 |

It is evident that the latter example may be used for centerfire cartridges and shot shells.

It is to be distinctly understood that such a natural occurring glass may be used in varying types of priming mixtures, and that the precise amount of each ingredient may vary, and that the above are merely examples.

By means of the invention herein, applicant has produced a satisfactory priming composition by the use of a comminuted natural occurring glass, and it is to be understood that the foregoing priming mixtures are merely typical thereof and the appended claims are to be broadly construed.

What is claimed is:

1. A priming mixture including a zoisitic aplite rock.

2. An ammunition priming mixture containing zoisitic aplite rock having substantially the following mineralogical composition:

| | Per cent |
|---|---|
| Zoisite | 23 |
| Albite | 55 |
| Titanite, Apatite, Clino-zoisite | 2 |
| Quartz | 2 |
| Sericite | 13 |
| Microcline | 5 |

3. A priming composition containing zoisitic aplite rock of a chemical composition substantially as follows:

| | Per cent |
|---|---|
| Silica | 59.5 |
| Ferric oxide | .35 |
| Alumina | 25.0 |
| Calcium oxide | 6.9 |
| Soda and potash | 7.8 |

WILLI BRUN.